United States Patent [19]
Okamoto

[11] Patent Number: 6,045,195
[45] Date of Patent: Apr. 4, 2000

[54] WHEEL COVER

[75] Inventor: Yoshiaki Okamoto, Akashi, Japan

[73] Assignee: Pascal Laboratory Co., Ltd., Hyogo-Ken, Japan

[21] Appl. No.: 09/144,192

[22] Filed: Aug. 31, 1998

[51] Int. Cl.[7] .................................................. B60B 7/00
[52] U.S. Cl. ................ 301/37.1; 301/37.25; 301/37.34; 301/37.42; 301/37.37; 40/587
[58] Field of Search ........................... 40/587; 301/37.25, 301/37.37, 37.34, 37.42, 37.1, 37.38

[56] References Cited

U.S. PATENT DOCUMENTS

| | | | |
|---|---|---|---|
| 1,432,274 | 10/1922 | Braucher | 301/37.25 |
| 1,478,475 | 12/1923 | Jago et al. | 40/587 |
| 1,665,437 | 4/1928 | Booth | 301/37.37 |
| 2,130,220 | 9/1938 | Ball et al. | 301/37.25 |
| 2,169,237 | 8/1939 | Gasco | 301/108.1 |
| 2,548,070 | 4/1951 | Ryan | 301/37.25 |
| 2,631,204 | 3/1953 | Kibiger | 40/587 |
| 2,707,131 | 4/1955 | Sundberg | 301/108.1 |
| 2,754,154 | 1/1956 | Solow | 301/37.25 |
| 2,759,282 | 8/1956 | Lecourt | 40/587 |
| 2,762,469 | 9/1956 | Lyon | 301/37.25 |
| 2,869,262 | 1/1959 | Lucas | 40/587 |
| 2,997,344 | 8/1961 | Whiteman | 301/37.25 |
| 3,219,391 | 11/1965 | Hettinger | 301/37.25 |
| 3,722,958 | 3/1973 | Marshall | 301/37.25 |
| 4,040,582 | 8/1977 | Krauss | 301/37.34 |
| 4,214,683 | 7/1980 | Wills et al. | 362/61 |
| 4,678,239 | 7/1987 | Matsushita | 301/37.25 |
| 4,707,035 | 11/1987 | Kondo et al. | 301/37.37 |
| 4,929,030 | 5/1990 | Park | 301/37.25 |
| 4,981,329 | 1/1991 | Koch et al. | 301/37.25 |
| 5,190,354 | 3/1993 | Levy et al. | 301/37.25 |
| 5,263,770 | 11/1993 | Goudey | 301/37.37 |
| 5,490,342 | 2/1996 | Rutterman et al. | 40/587 |
| 5,588,715 | 12/1996 | Harlen | 301/37.25 |
| 5,659,989 | 8/1997 | Hsiao et al. | 301/37.1 |
| 5,876,108 | 3/1999 | Chien | 362/35 |
| 5,957,542 | 9/1999 | Boothe et al. | 301/37.25 |

FOREIGN PATENT DOCUMENTS

| | | | |
|---|---|---|---|
| 541032 | 5/1957 | Canada | 301/37.37 |
| 925539 | 5/1973 | Canada | 301/37.37 |
| 330534 | 8/1989 | European Pat. Off. | 301/37.25 |

*Primary Examiner*—S. Joseph Morano
*Assistant Examiner*—Long Bao Nguyen
*Attorney, Agent, or Firm*—Jordan & Hamburg LLP

[57] ABSTRACT

A wheel cover of the present invention includes a fixable side fixture fixably mounted to the center of a wheel of a vehicle, so as to be able to position the cover to the central part thereof; a movable side fixture pivotally mounted to the central part of the fixable side fixture through a bearing; a wheel cover body, substantially in the shape of a disc and mounted on the movable side fixture, having a space between itself and the wheel; a device for biasing the wheel cover body, in order to prevent integral rotation with the wheel; and a dynamo mounted on the movable side fixture or wheel cover body and driven rotatably by rotating of said wheel, so that the dynamo is mounted on the wheel cover, so as to generate electricity by rotation with the wheel and wheel cover body mounted rotatably to the wheel when the vehicle is in motion, electricity generated by the dynamo is used for a illumination or transmitter of electromagnetic wave, or the like, as power source.

12 Claims, 25 Drawing Sheets

WHEEL COVER

BACKGROUND OF THE INVENTION

The present invention relates to a wheel cover for a motor vehicle; i.e. a passenger car, a truck or a bus.

A conventional wheel cover comprises a wheel cover body covering the disc part of the wheel and a plurality of fitting pieces formed in the wheel cover body, for fixing to the disc part or the rim of the wheel. Because the above-mentioned wheel cover is fixed to the disc part or rim of the wheel with a plurality of fitments, people cannot see a design drawn on the wheel cover body because it rotates with the wheel, and therefore the design depicted thereon also rotates.

People can see the design depicted on the wheel cover when the vehicle is stationary. However, as the vehicle may stop with the wheel in any rotational position, the design may not always be the right way up. Because of this, the choice of design is restricted to rotationally non-varying shapes.

SUMMARY OF THE INVENTION

Therefore, it is an object of the present invention to provide a wheel cover which can prevent rotation of the wheel cover body when the wheel itself rotates, so that a design drawn thereon can clearly be seen at all times.

It is another object of the present invention to provide a wheel cover wherein the cover body will always remain positioned the right way up.

It is another object of the present invention to provide a wheel cover which can be prevented from looking unsightly.

It is further object of the present invention to provide a wheel cover which can generate electiricity automatically due to the rotating of the wheel.

The above and further objects and novel features of the invention will more fully appear from the following detailed description when the same is read in connection with the accompanying drawings.

It is to be understood that these are for the purpose of illustration only and are not limited to be a definition of the limits of the invention.

DESCRIPTION OF THE PREFERRED EMBODIMENT

Figure 1:
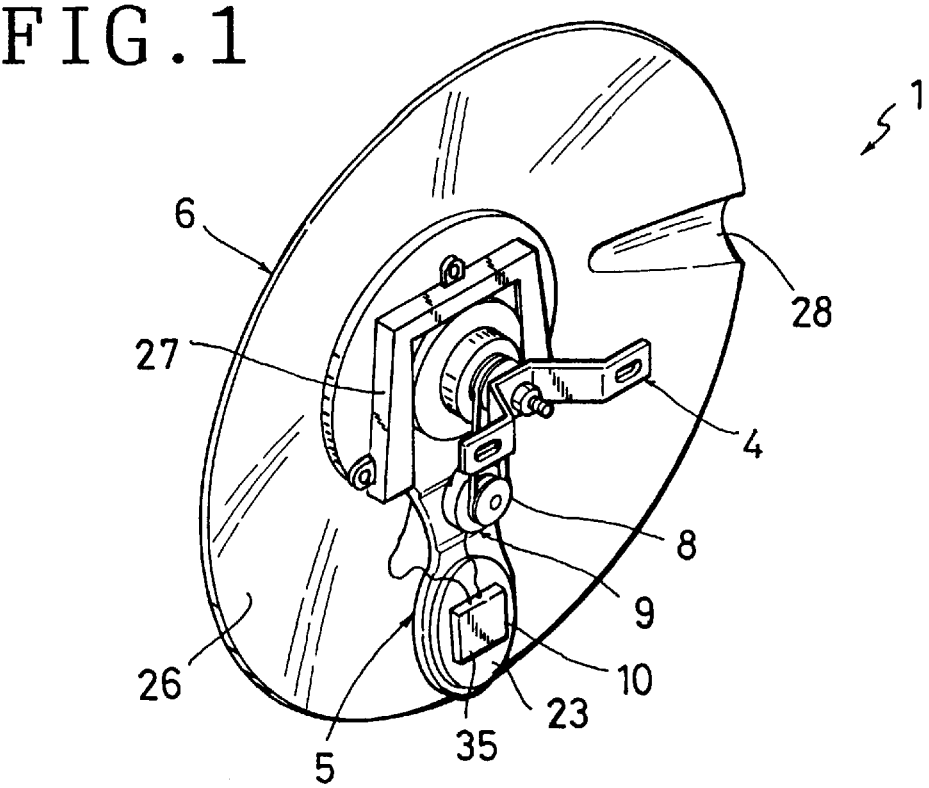
FIG. 1 is a perspective view from the rear showing a first embodiment of the present invention.
Figure 2:
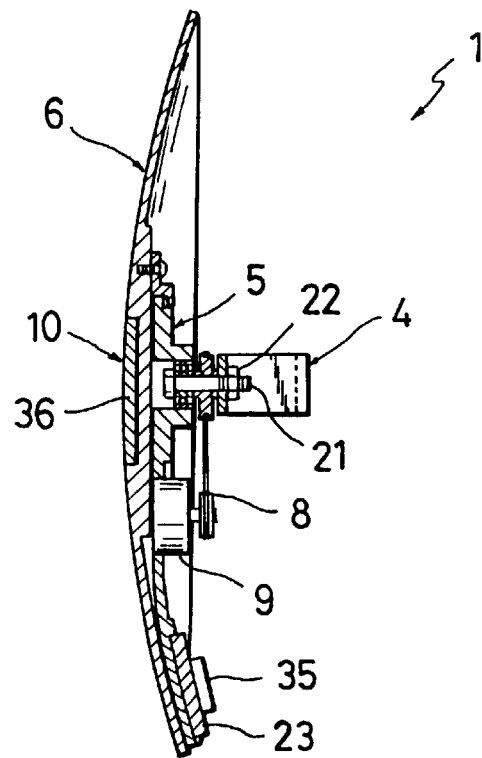
FIG. 2 is a vertical cross-sectional view showing a first embodiment of the present invention.

Preferred embodiments of the present invention will now be described in more detail below referring to the accompanying drawings.

FIGS. 1 to 15 illustrate a first embodiment of the present invention wherein a wheel cover 1 is mounted on a wheel 3 of the vehicle; in this embodiment, it is mounted on a passenger car 2. The wheel cover 1 comprises a fixable side fixture 4, a movable side fixture 5, a wheel cover body 6 in the shape of a disc, rotating protection means of the wheel cover body 7, a dynamo 9 and an electric appliance 10. The fixable side fixture 4 is fixable mounted in a position so that the central part thereof can be positioned at the center of the wheel 3. The movable side fixture 5 is rotatably mounted to the central part of the fixable side fixture 4. The wheel cover body 6 is mounted to the movable side fixture 5 while the wheel cover body 6 has a space between itself and the wheel 3. Rotating protection means 7 prevents from the rotating as one with the wheel 3 and the wheel cover body 6. The dynamo 9 is mounted to the movable side fixture 5 such that the dynamo 9 is driven by drive means 8 due to rotation of the wheel 3, that is, of the fixable side fixture 4. The electric appliance 10 is used in electricity generated by the dynamo 9 and is mounted to the movable side fixture 5 or the wheel cover body 6.

Figure 3:
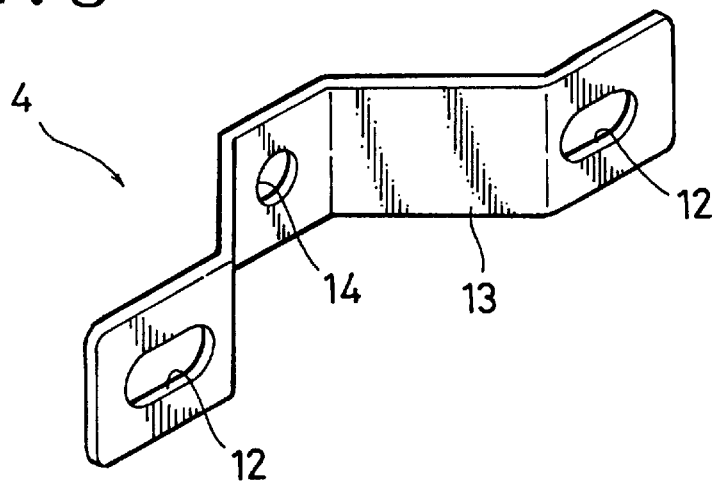
FIG. 3 is an explanation view of a fixable side fixture according to a first embodiment of the present invention.

As illustrated in FIG. 3, the fixable side fixture 4 comprises a fixable side fixture body 13 having an axle insertion hole 14 in the central part of the fixture body. Wheel bolt holes 12,12 located at both sides thereof are provided to receive wheel bolts 11,11 for fixing. The fixable side fixture body 13 is formed in the shape of a roof. The axle insertion hole 14 is located in the central portion of the fixable side fixture body 13.

Figure 4:
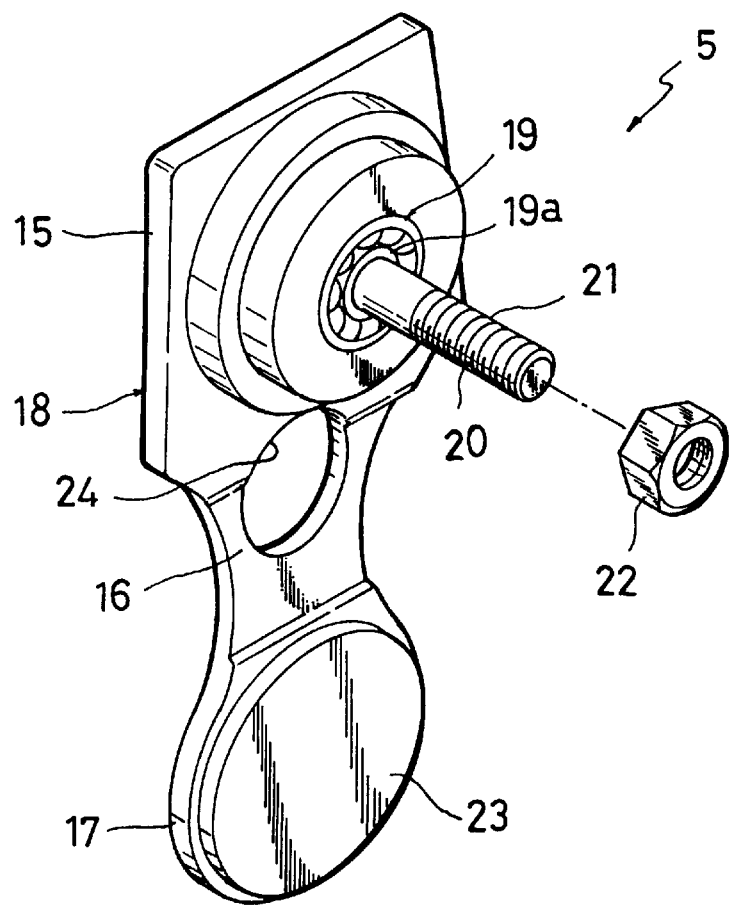
FIG. 4 is an explanation view of a movable side fixture according to a first embodiment of the present invention.

As illustrated in FIG. 4, the movable side fixture 5 comprises a movable side fixture body 18, a bearing 19, an axle 21, a nut 22, a weight 23 and a dynamo mounting portion 24. The movable side fixture body 18 is made of hard rubber or synthetic resin materials; the upper part thereof consists of a fitting piece 15 in the shape of a square; a weight supporting part 17 through a connection 16 is located in the lower part thereof. The bearing 19 is fixed to the nearly central part of the fitting piece 15 of the movable side fixture body 18. The axle 21 is fitably fixed to a rotating ring 19 a located at center portion of the bearing 19, inserted through an axle insertable hole 14 of the fixable side fixture 4. Thread areas 20 are present at the outside section of the movable side fixture. The nut 22 fixes the axle 21 to the fixable side fixture 4 by securing to the thread 20 of the axle 21. The weight 23 as the rotating protection means 7 is fixed with adhesive to the weight supporting part 17. The dynamo mounting portion 24 is formed in the connection 16.

Figure 5:
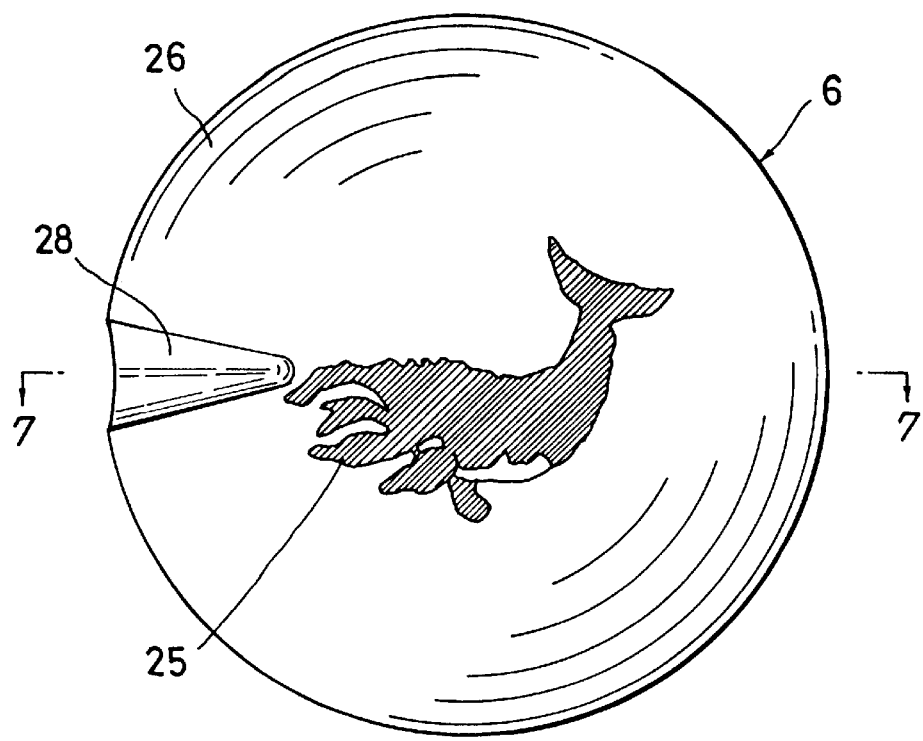
FIG. 5 is a front view of a wheel cover body showing a first embodiment of the present invention.
Figure 6:
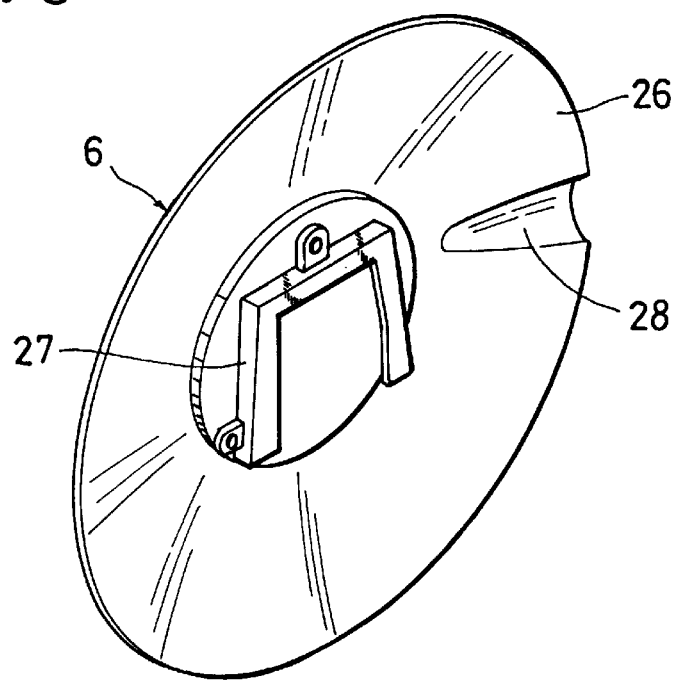
FIG. 6 is a perspective view showing the rear side of a wheel cover body.
Figure 7:
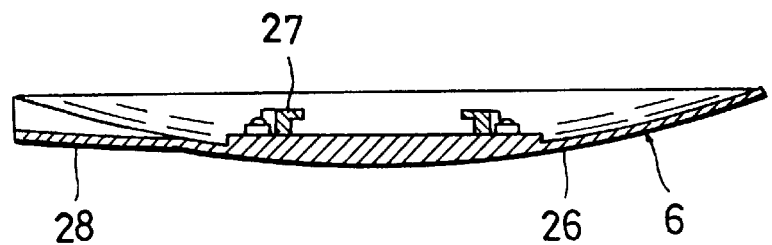
FIG. 7 is a cross-sectional view taken on line 7—7 of FIG. 5.

On the wheel cover body 6 is drawn a design 25; the design may be, for example, an advertisement. As illustrated in FIGS. 5 to 7, the wheel cover body 6 is made of metal or synthetic resin material and comprises a wheel cover housing 26, a fitting part 27 and an air current guide part 28. The wheel cover housing 26 is in the shape of a disc. The fitting part 27 is located in the central part of the inner wall of the wheel cover housing 26; as it is formed in the shape of a channel and widens out to an angle, it can be removably inserted. The air current guide part 28 takes the shape of a nose and is formed in the shape of the portion which is positioned to the rear on the wheel cover housing 26 when the vehicle is in motion.

Figure 8:
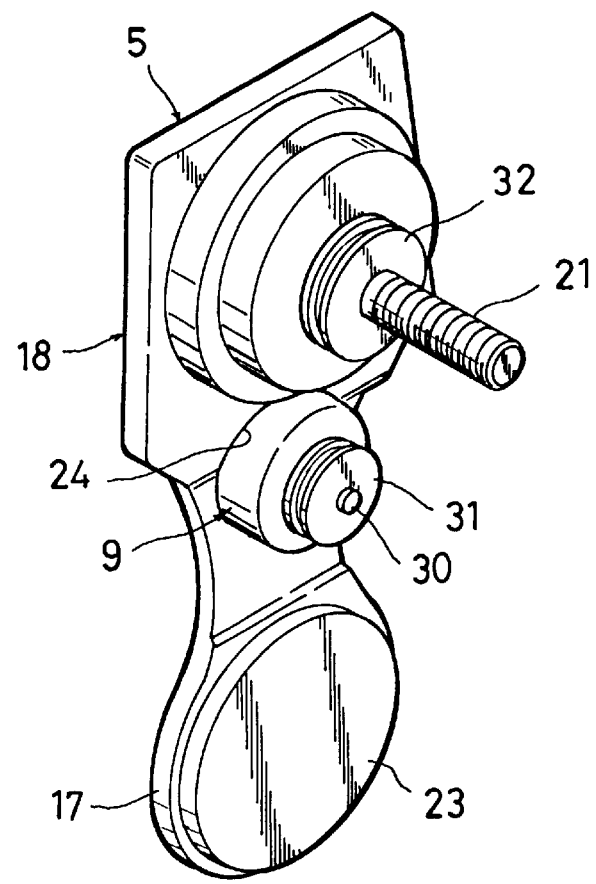
FIG. 8 is an explanation view showing the way in which a generator is mounted.
Figure 9:
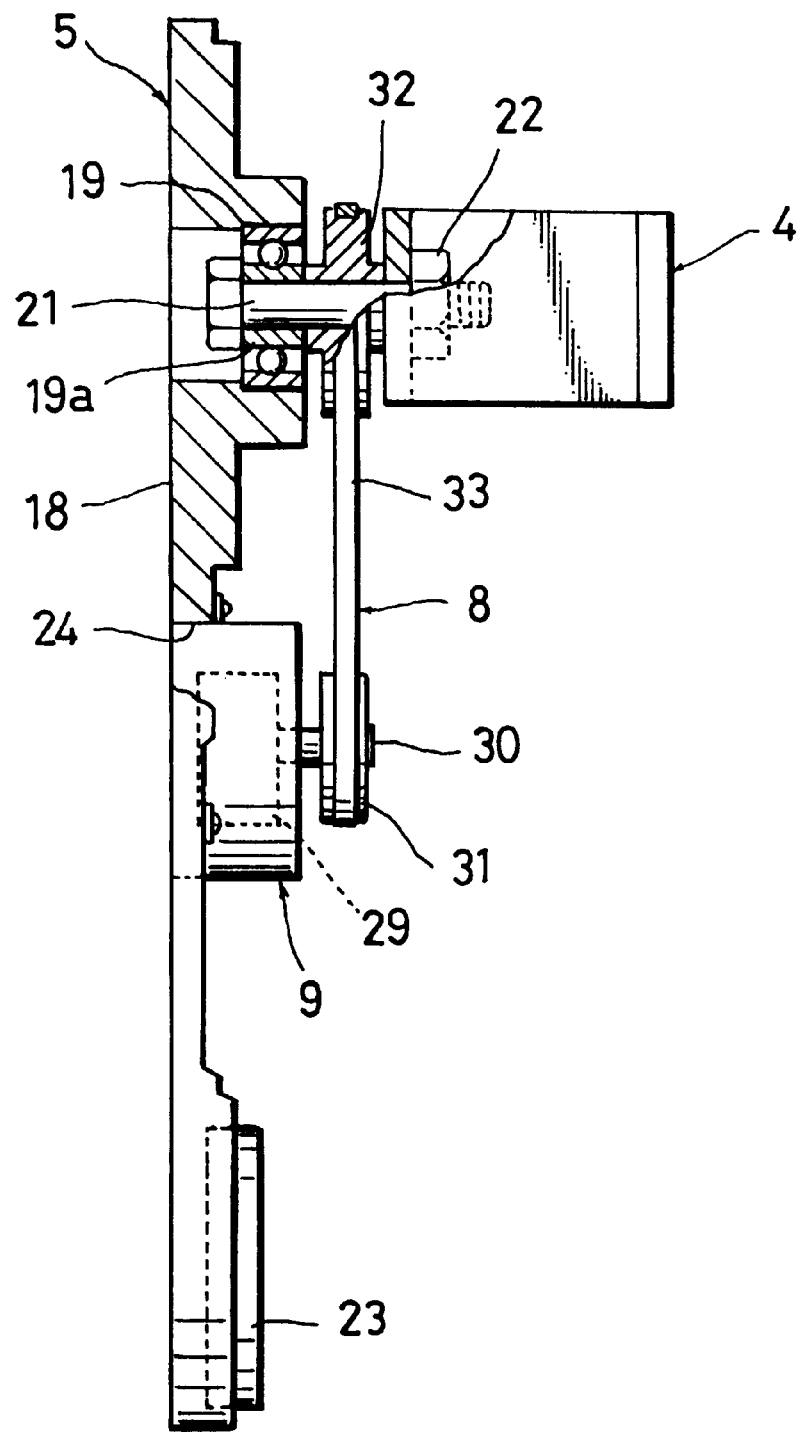
FIG. 9 is an explanation view showing means for driving.

As illustrated in FIG. 8, the dynamo 9 is installed to the dynamo mounting porion 24 of the movable side fixture 5; as it is formed in the shape of a thin type. Drive means 8 of the dynamo 9, as illustrated in FIG. 9, comprises a driving pulley 31, a drive pully 32 and a belt 33. The driving pulley 31 is mounted to a shaft 30 of a rotor 29 in the dynamo 9. The drive pulley 32 is inserted on the axle 21 of the movable side fixture 5 and interposed fixedly between the rotating ring 19a of the bearing 19 and the fixable side fixture 4.

The electric appliance 10 comprises a capacitor 35 mounted to the movable side fixture 5 and an indicator 36 mounted to the wheel cover body 6 which is connected to the capacitor 35, the indicator 36 used for illuminations.

Additionaly, in this embodiment, the use of a driving pulley 31, a drive pulley 32 and a belt 33 as drive means 8 which are installed to the side of a wheel 3 is explained, however, the present invention may use the driving pulley 31, drive pulley 32 and a belt as drive means 8 which are installed as to situate between the wheel cover body 6 and the movable side fixture body 18.

Figure 10:
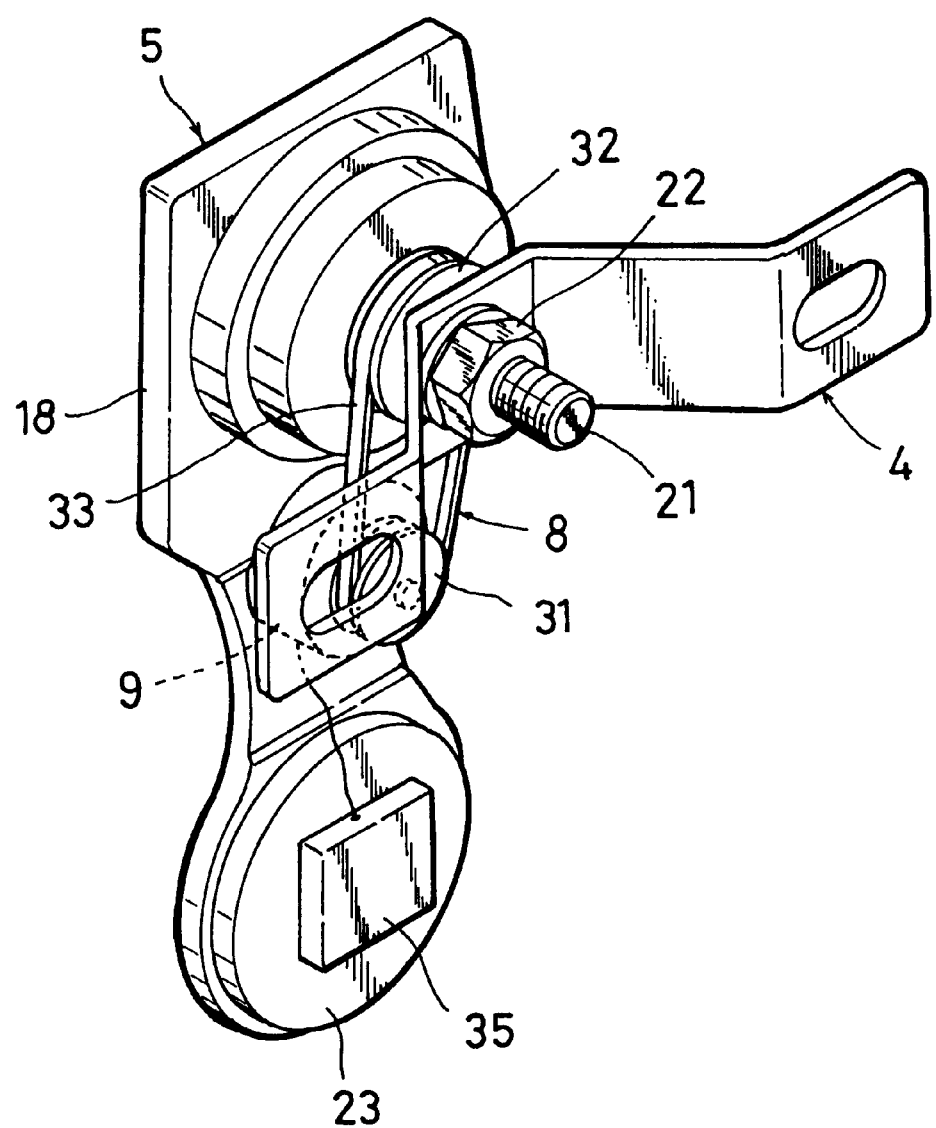
FIG. 10 is an explanation view showing a movable side fixture having a generator.

In the above-mentioned wheel cover 1, as illustrated in FIG. 10, the dynamo 9 and the capacitor 35 are mounted to the movable side fixture 5. The axle 21 of the movable side fixture 5 is inserted into the drive pulley 32, and the belt 33 is attached to the drive pulley 32. After that, the nut 22 is screwed into the thread 20 of the axle 21 and the movable side fixture 5 is mounted to the fixable side fixable side fixture 4 such that the drive pulley 32 is integrally provided.

Figure 11:
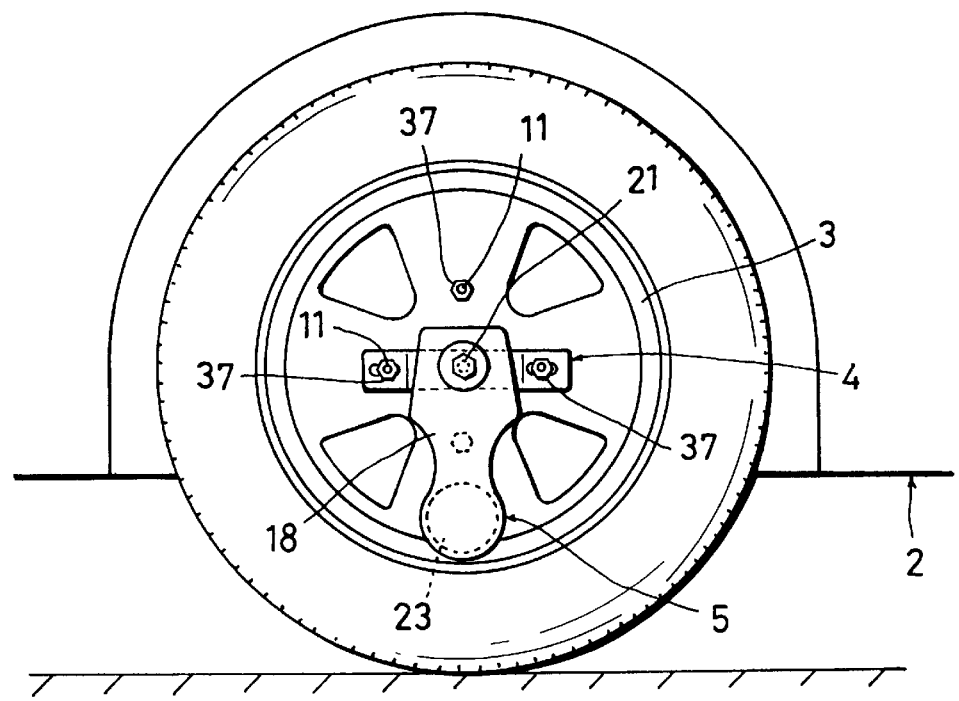
FIG. 11 is an explanation view showing the way which a fixable side fixture attached to a wheel.

Following this, as illustrated in FIG. 11, the nuts 37,37, screwed in the wheel 3, is removed. After the wheel bolts 11,11 are inserted into their corresponding holes 12,12 formed on either side of the fixable side fixture 4; the nuts 37,37 are screwed in the wheel bolts 11,11 and locked.

Figure 12:
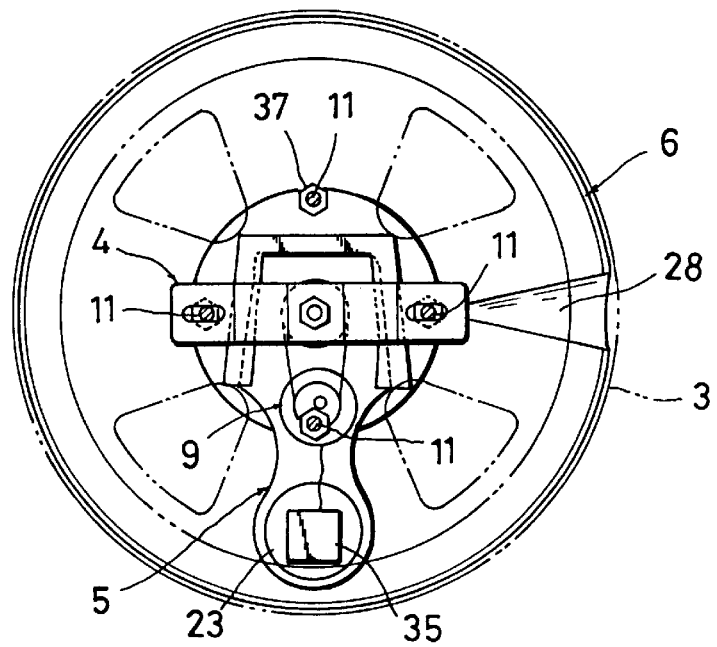
FIG. 12 is an explanation view showing the way in which a wheel cover body is mounted to a movable side fixture.
Figure 13:
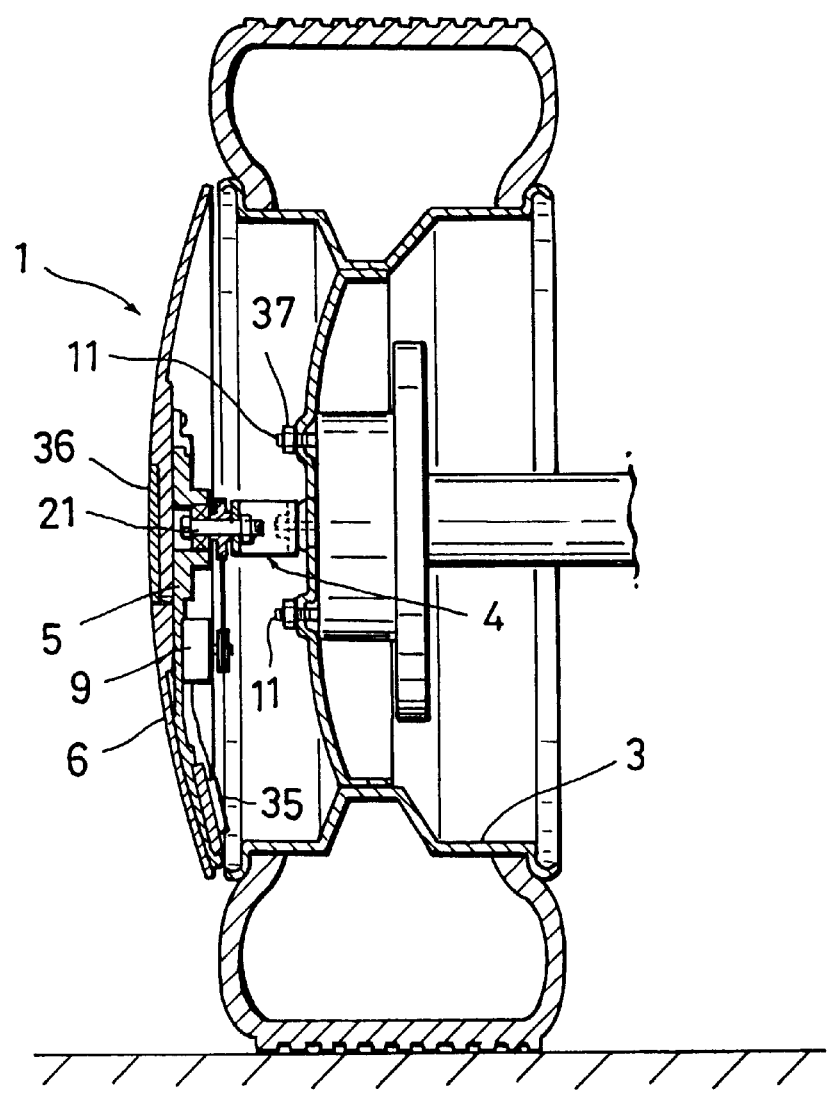
FIG. 13 is a cross-sectional view showing the way in which a wheel cover body is attached to a movable side fixture.
Figure 14:
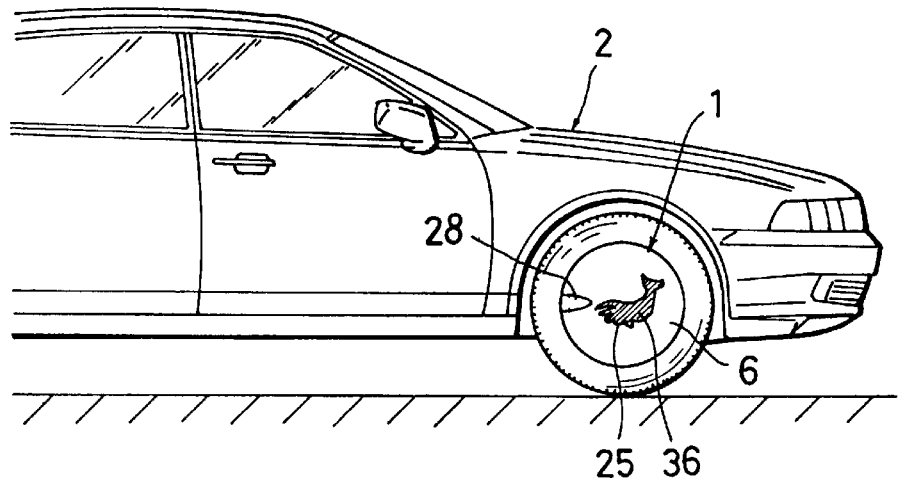
FIG. 14 is an explanation view showing a first embodiment of the present invention in use.

Additionaly, as illustrated in FIGS. 12 and 13, after the capacitor 35 is connected to the indicator 36 of the wheel cover body 6, the fitting piece 15 of the movable side fixture 5 is set in the fitting part 29 of the wheel cover 6. Then, the movable side fixture body 18 improves the flexibility of the arrangement, and the weight supporting part 17 attaches closely with the inner wall of the wheel cover body 6 by pushing pressure. In the above-mentioned wheel cover 1 fixed to the wheel 3, the air current guide part 28 of the wheel cover housing 26 as illustrated in FIG. 12 is directed to the backward of the passenger car 2 due to the weight 23 of the movable side fixture 5 as rotating protection means 7.

In this case, the fixable side fixture 4 fixed to the wheel 3 will rotate with the wheel 3 when the car 2 moves, but rotation of the wheel cover body 6 is prevented due to the wheel cover body 6 is mounted to the movable side fixture 5 which is mounted rotatably to the fixable side fixure 4, it becomes non-rotating state.

Figure 15:
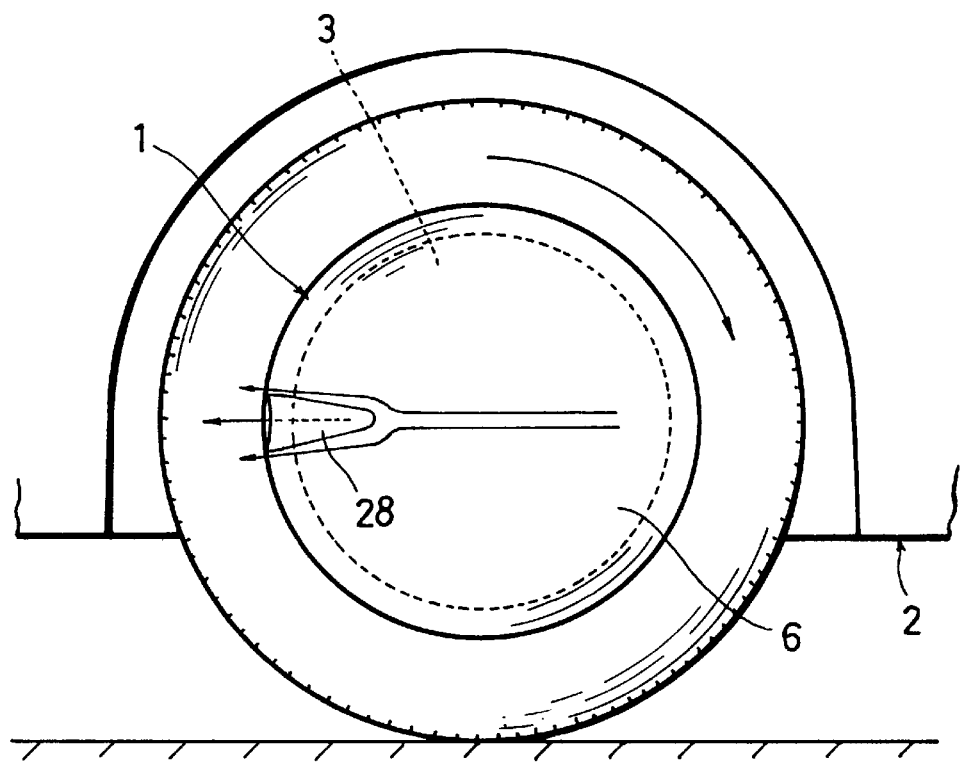
FIG. 15 is an explanation view indicating air current flow during use of a first embodiment of the present invention.

Moreover, as illstrated in FIG. 15, an air current occurs when the car 2 is in motion, but the air current flowing to the surface of the wheel cover body 7 flows along the upper and lower parts of the air current guide part 28 and rotation of the wheel cover body 7 is constrained. In addition, the rotation of the wheel cover body 6 is further constrained due to the weight 23 as rotating protection means 7.

Furthermore, the drive pulley 32 is fixed to the fixable side fixture 4 rotates due to the rotating of the wheel 3. Then, the driving pulley 31 rotates through the belt 33, and the rotor 29 in the dynamo 9 allows to ratate and electricity is generated. Electricity generated by the dynamo 9 is condenced into the capacitor 35, and electricity is supplied to the indicator 36.

DIFFERENT PREFERRED EMBODIMENTS OF THE INVENTION

Other embodiments of the present invention will now be described referring to FIGS. 16 to 38. Throughout the drawings of the embodiments, components identical to those in the first embodiment are denoted by the same numerals s of the first embodiment (but with letters added thereafter) and will not be explained further.

Figure 16:
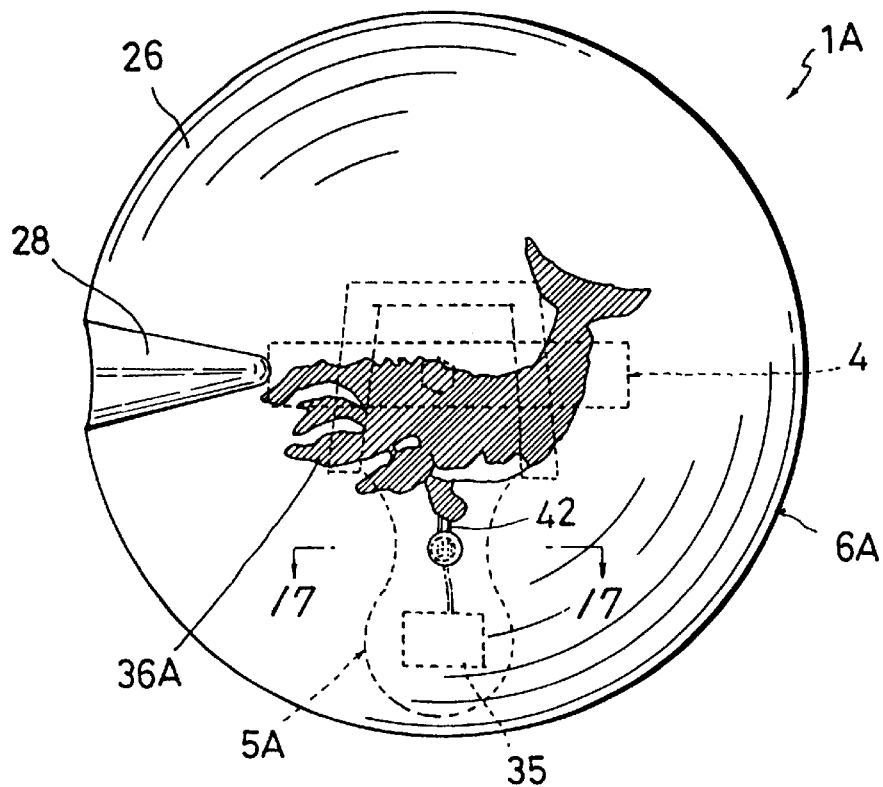
FIG. 16 is a front view cut-away view showing a second embodiment of the present invention.
Figure 17:
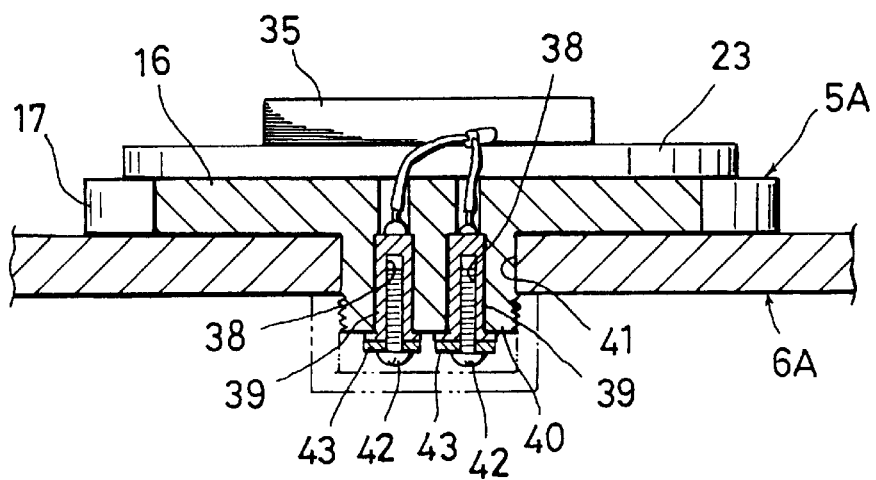
FIG. 17 is a cross-sectional view taken on line 17—17 of FIG. 16.
Figure 18:
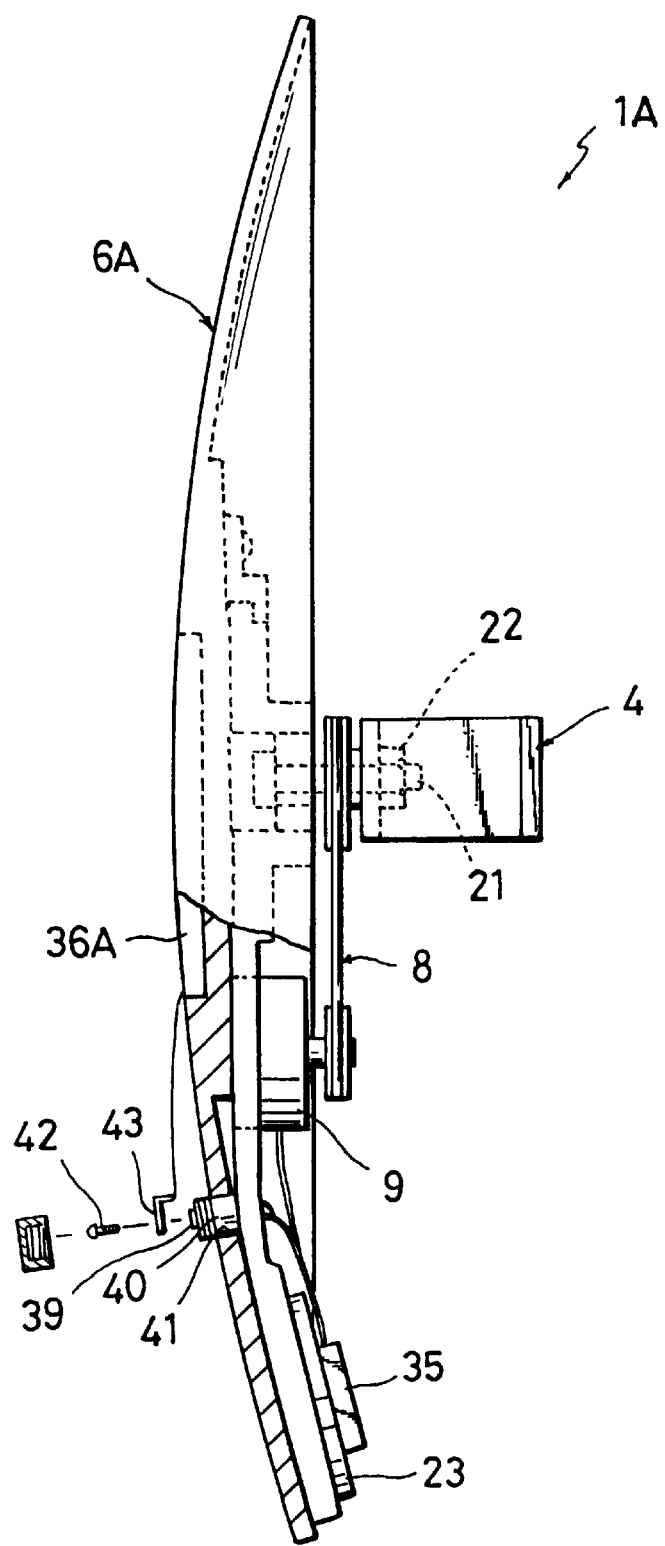
FIG. 18 is a partly cut-away side view showing a second embodiment of the present invention.

FIGS. 16 to 18 illustrate a second embodiment of the present invention. It is distinguished from the first embodiment in that the movable side fixture 5A includes a fitting piece 40 for the outer part of the connection 13, the fitting piece 40 having terminals 39,39 connected to the capacitor 35, the terminals 39,39 respectively having screw holes 38,38, in that the wheel cover body 7A includes a fitable hole 41 through which a fitting piece 40 of the movable side fixture 5A is inserted, and in that an indicator 36A is mounted to the wheel cover body 6A and formed terminals 43,43, to which the screw holes 38, 38 of the terminals 39,39 on the fitting piece 40 are connected by screws 42,42. A wheel cover 1A with the movable side fixture 5A, wheel cover body 6A and indicator 36A according to the second embodiment will have similar advantages to that according to the first embodiment; in addition, connecting operations with the indicator 36 and capacitor 35 can be done easily.

Figure 19:
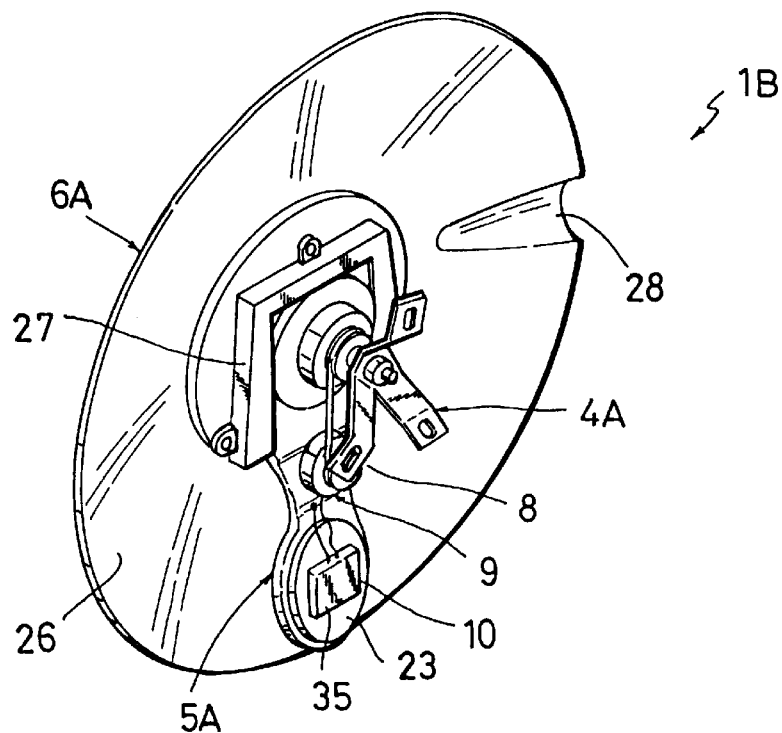
FIG. 19 is a perspective view from the rear showing a third embodiment of the present invention.
Figure 20:
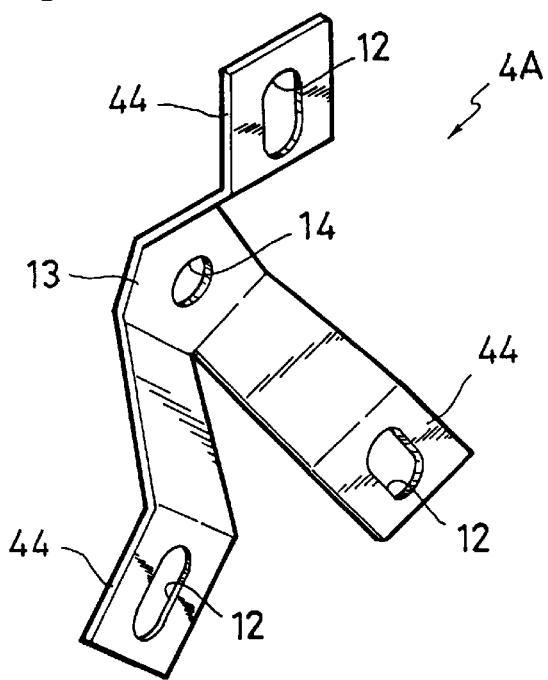
FIG. 20 is an explanation view of a fixable side fixture according to a third embodiment of the present invention.
Figure 21:
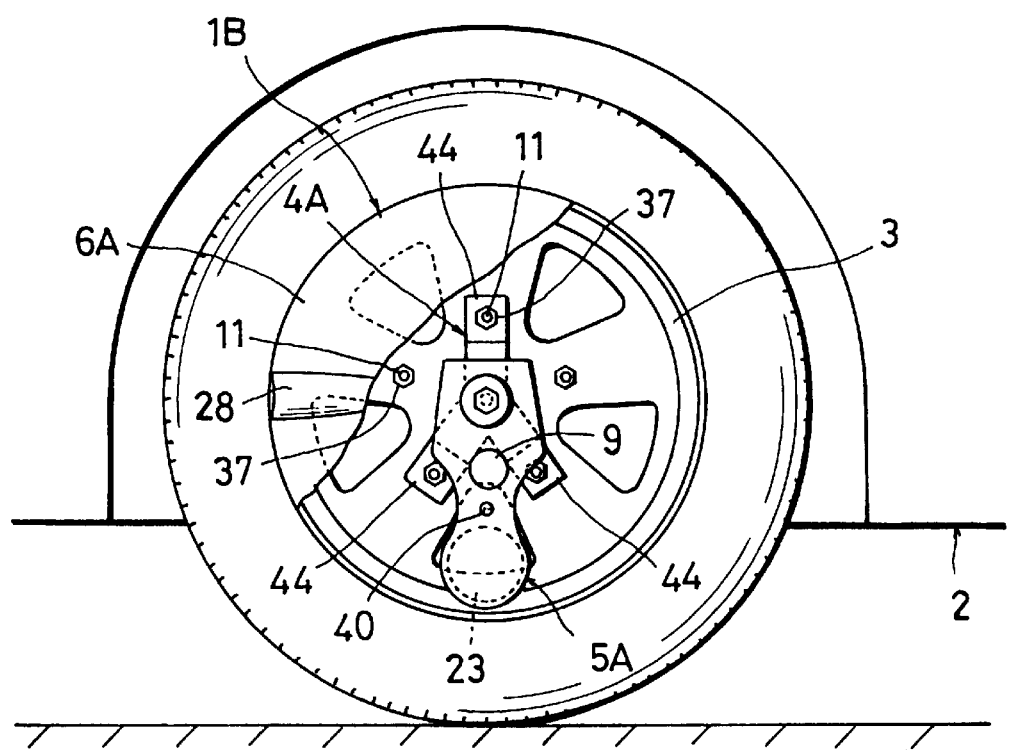
FIG. 21 is an explanation view showing the way which a fixable side fixture attached to a wheel.

FIGS. 19 to 21 illustrate a third embodiment of the present invention. It is distinguished from the second embodiment in that the fixable side fixture 4A has three legs 44,44,44; these legs are capable of fixing to the vehicle 2 and is able to fix to the wheel 3' with the uneven number of wheel bolts 11. A wheel cover 1B with the fixable side fixture 4B according to the third embodiment will have similar advantages to that according to the second embodiment.

Figure 22:
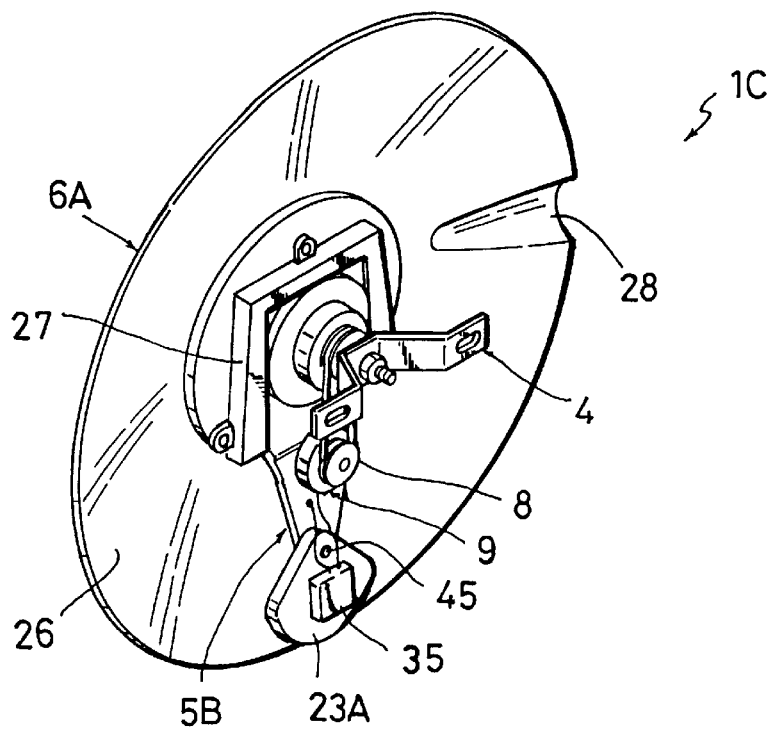
FIG. 22 is a perspective view from the rear showing a fourth embodiment of the present invention.
Figure 23:
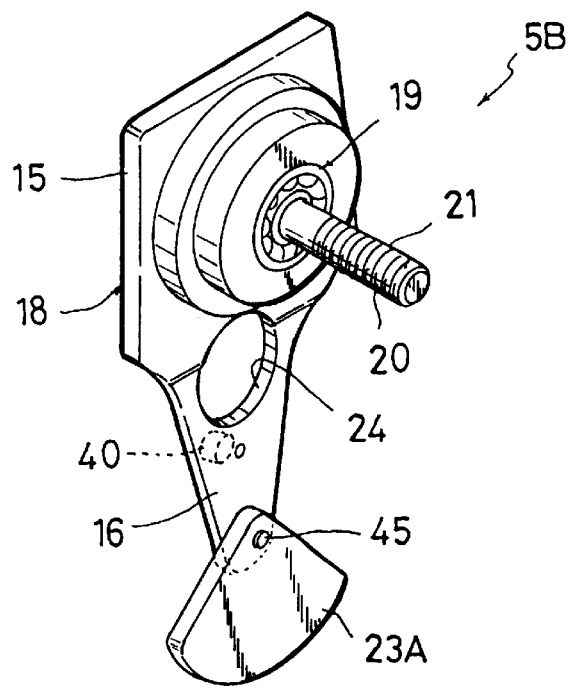
FIG. 23 is an explanation view of a movable side fixture according to a fourth embodiment of the present invention.
Figure 24:
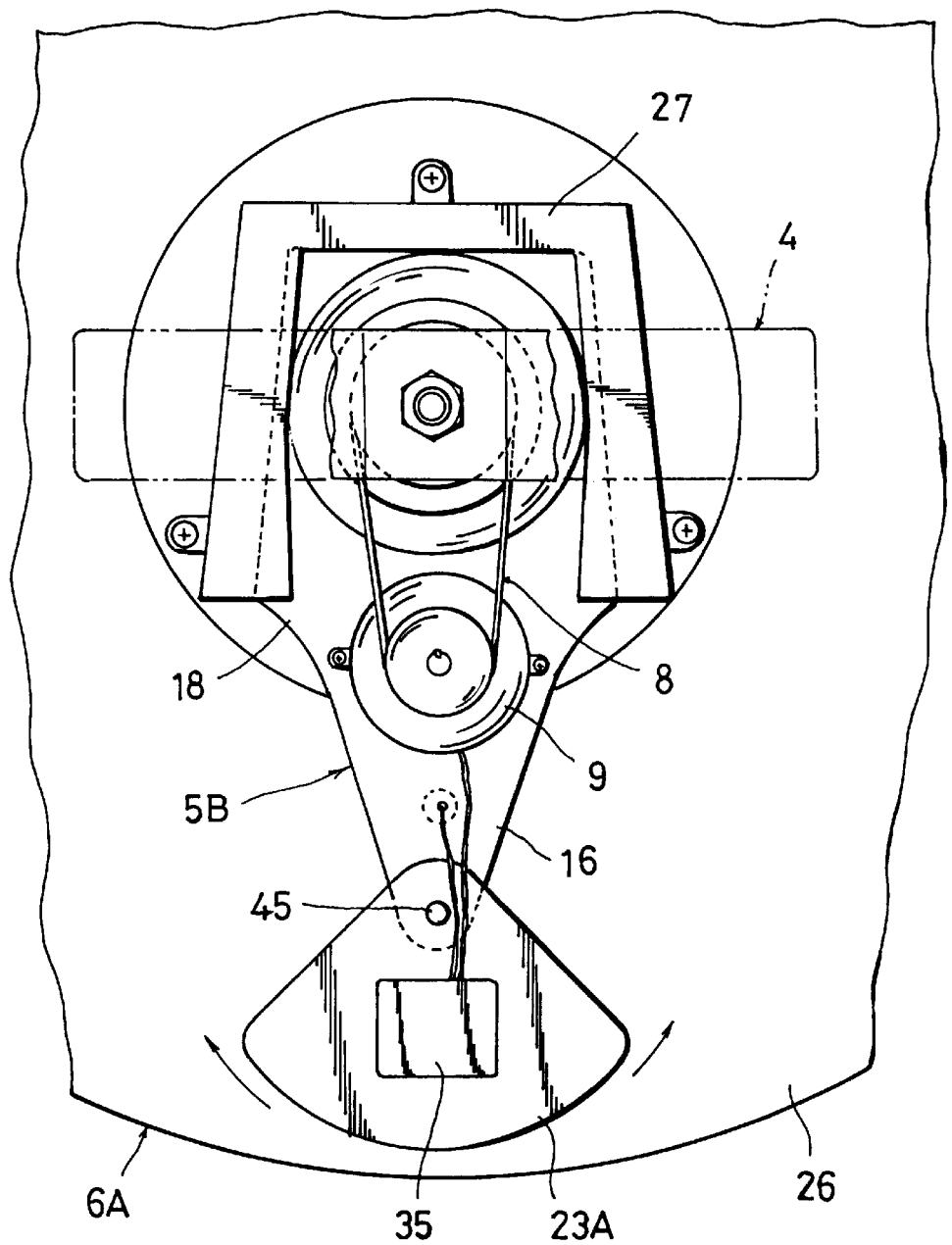
FIG. 24 is a mainly expanded back view from the rear showing a fourth embodiment of the present invention.

FIGS. 22 to 24 illustrate a fourth embodiment of the present invention. It is distinguished from the second embodiment in that a fan-shaped weight 23A is pivotably mounted to a free end of the connection 16 at the movable side fixture 5 by a pivot pin 45, capable of using both as a fitting piece. A wheel cover 1C with the movable side fixture 5B having the rotatable weight 23A according to the fourth embodiment will have similar advantages to that according to the second embodiment.

Figure 25:
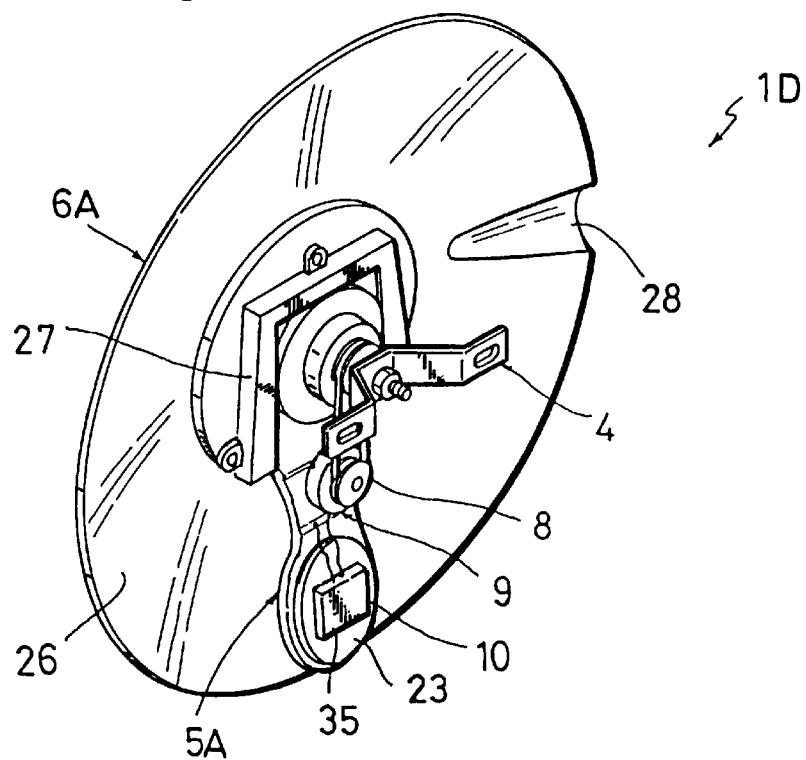
FIG. 25 is a perspective view from the rear showing a fifth embodiment of the present invention.
Figure 26:
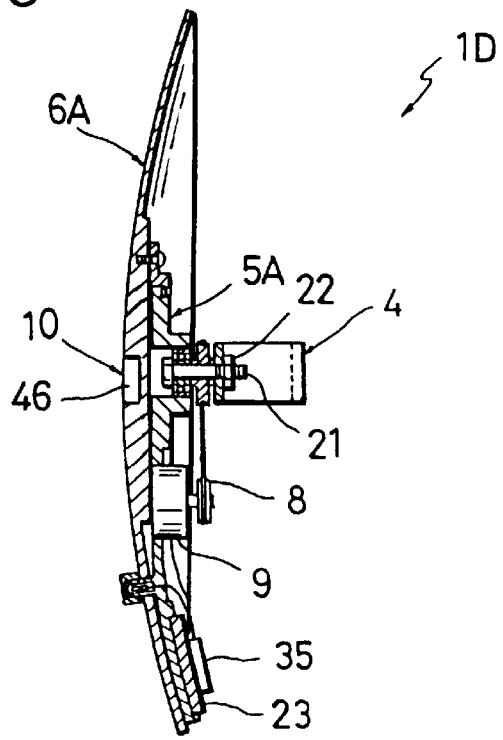
FIG. 26 is a vertical cross-sectional view showing a fifth embodiment of the present invention.
Figure 27:
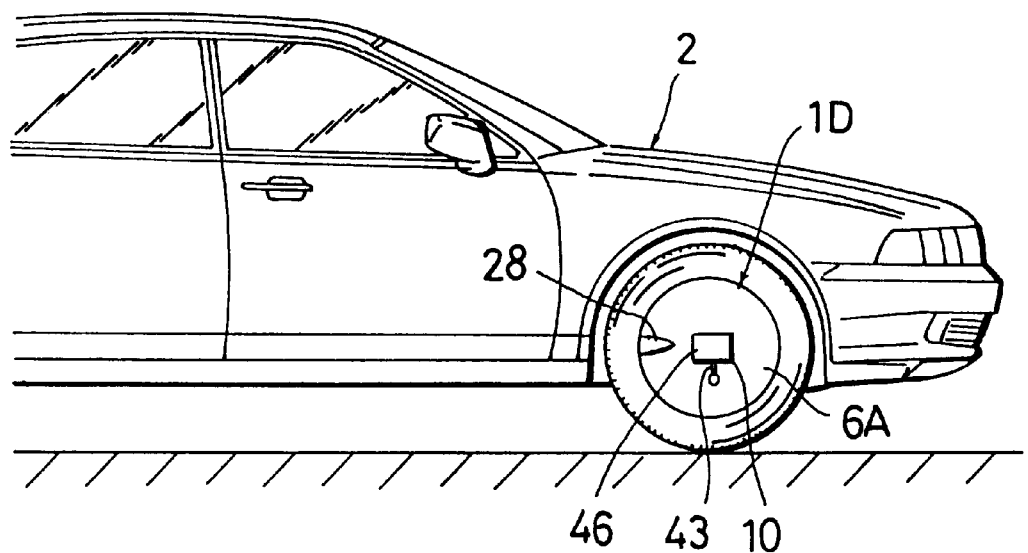
FIG. 27 is an explanation view showing a fifth embodiment of the present invention in use.

FIGS. 25 to 27 illustrate a fifth embodiment of the present invention. It is distinguished from the second embodiment in that a transmitter of electromagnetic wave 46 can transmit electromagnetic wave as the electric appliance 10 and allows to inform a place in which electromagnetic wave is transmitted. A wheel cover 1D according to the fourth embodiment will have similar advantages to that according to the second embodiment; in addition, when the vehicle is in motion, the transmitter transmits electromagnetic wave automatically, and its wave is received in receiving bases, so that the vehicle is confirmed where it is.

Figure 28:
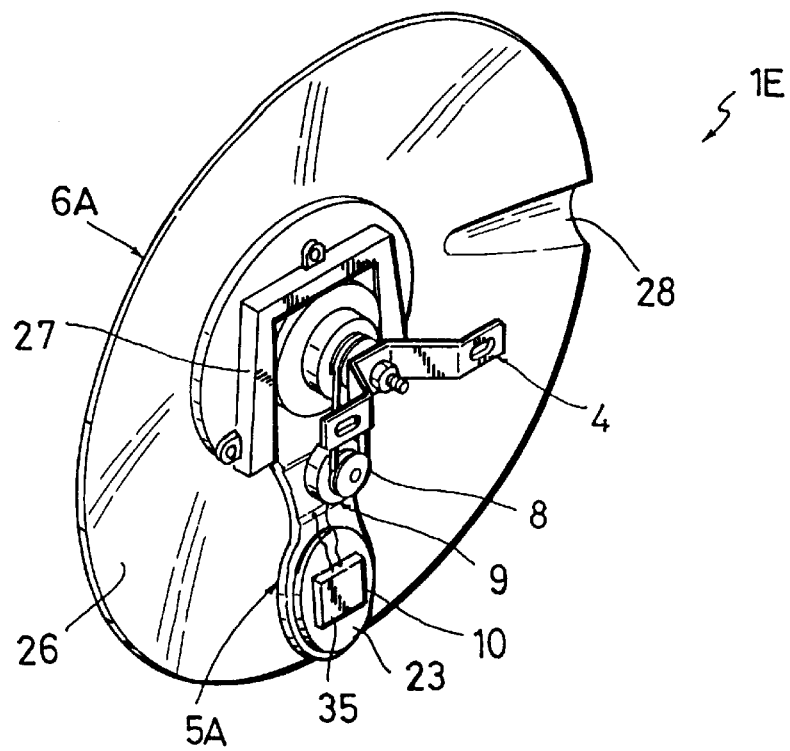
FIG. 28 is a perspective view from the rear showing a sixth embodiment of the present invention.
Figure 29:
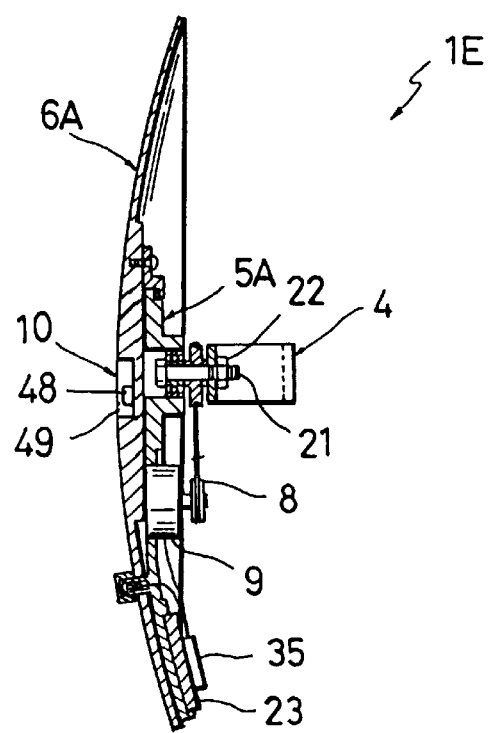
FIG. 29 is a vertical cross-sectional view showing a sixth embodiment of the present invention.
Figure 30:
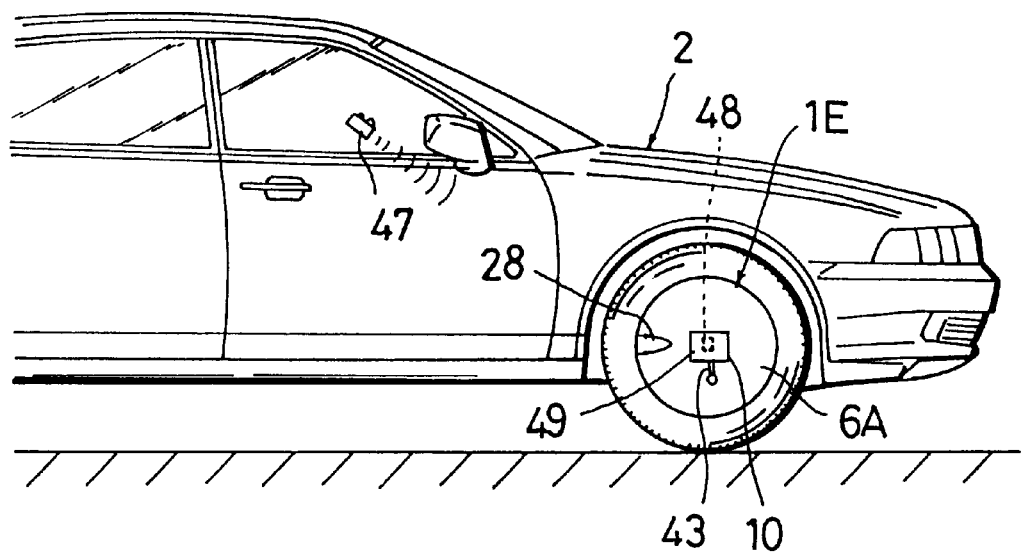
FIG. 30 is an explanation view showing a sixth embodiment of the present invention in use.
Figure 31:
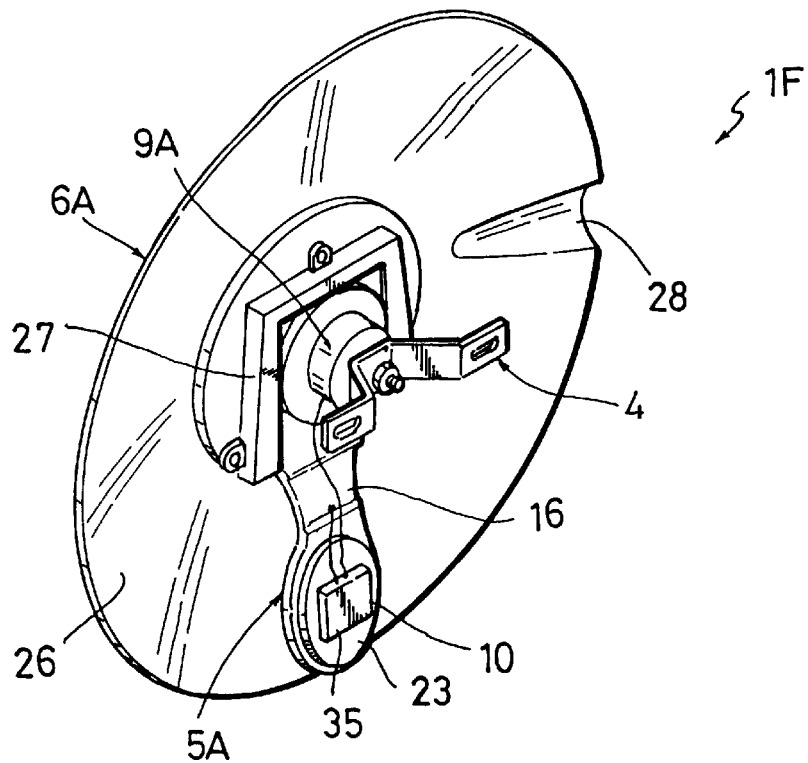
FIG. 31 is a perspective view from the rear showing a seventh embodiment of the present invention.
Figure 32:
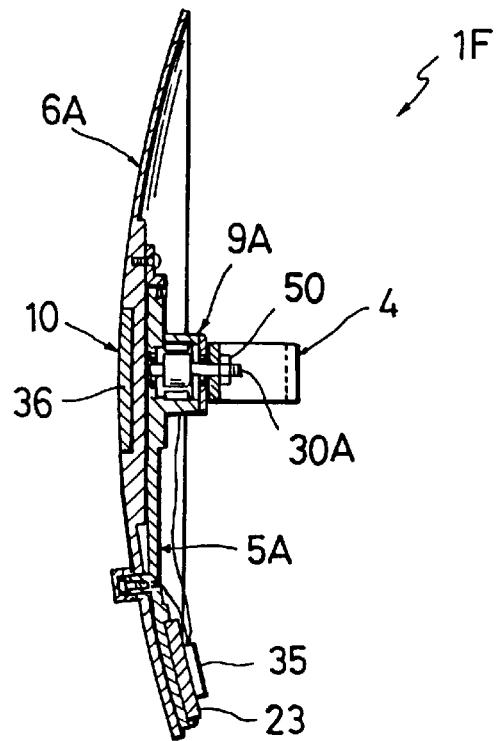
FIG. 32 is a vertical cross-sectional view showing a seventh embodiment of the present invention.
Figure 33:
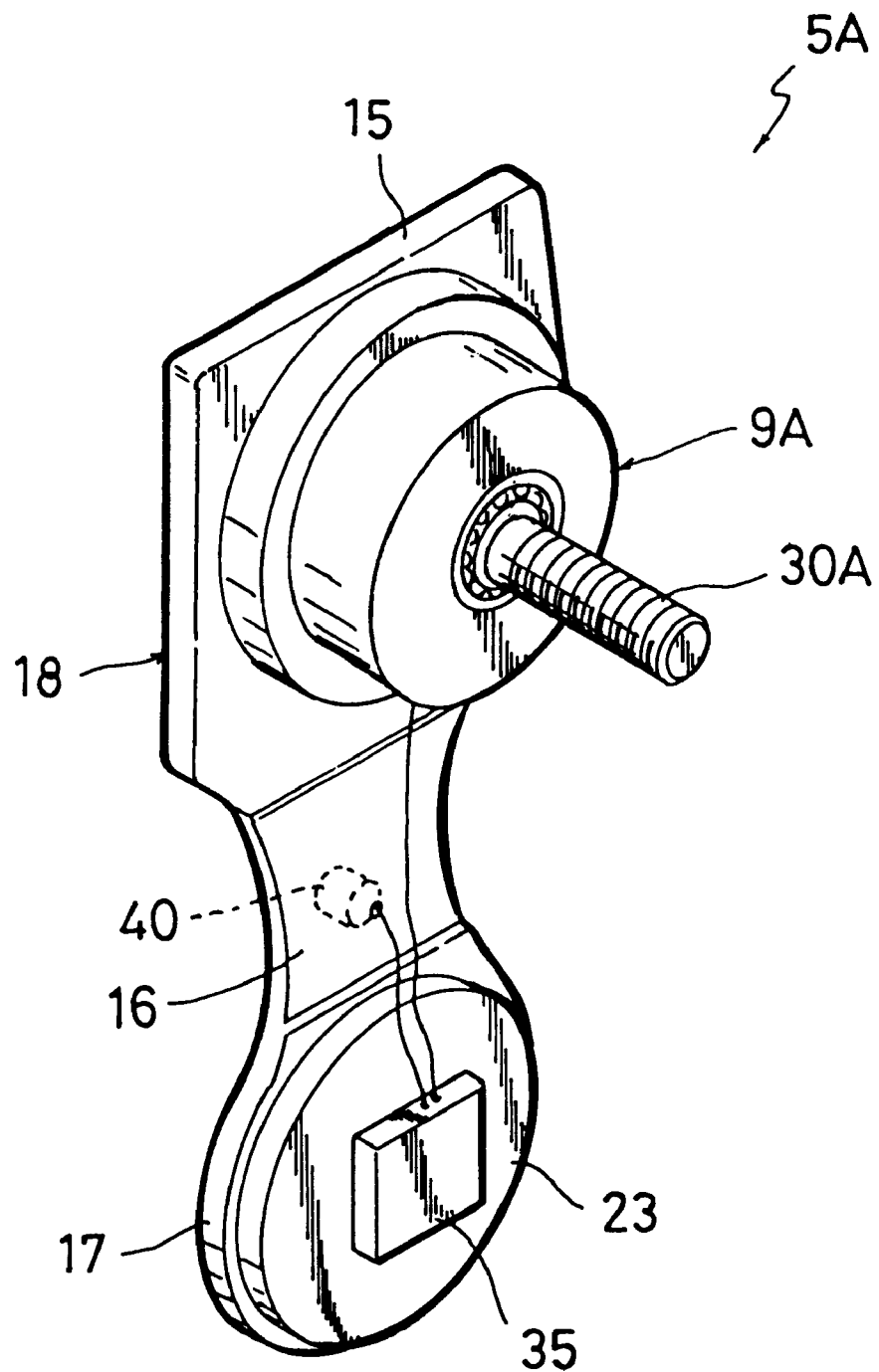
FIG. 33 is an explanation view of a movable side fixture according to a seventh embodiment of the present invention.
Figure 34:
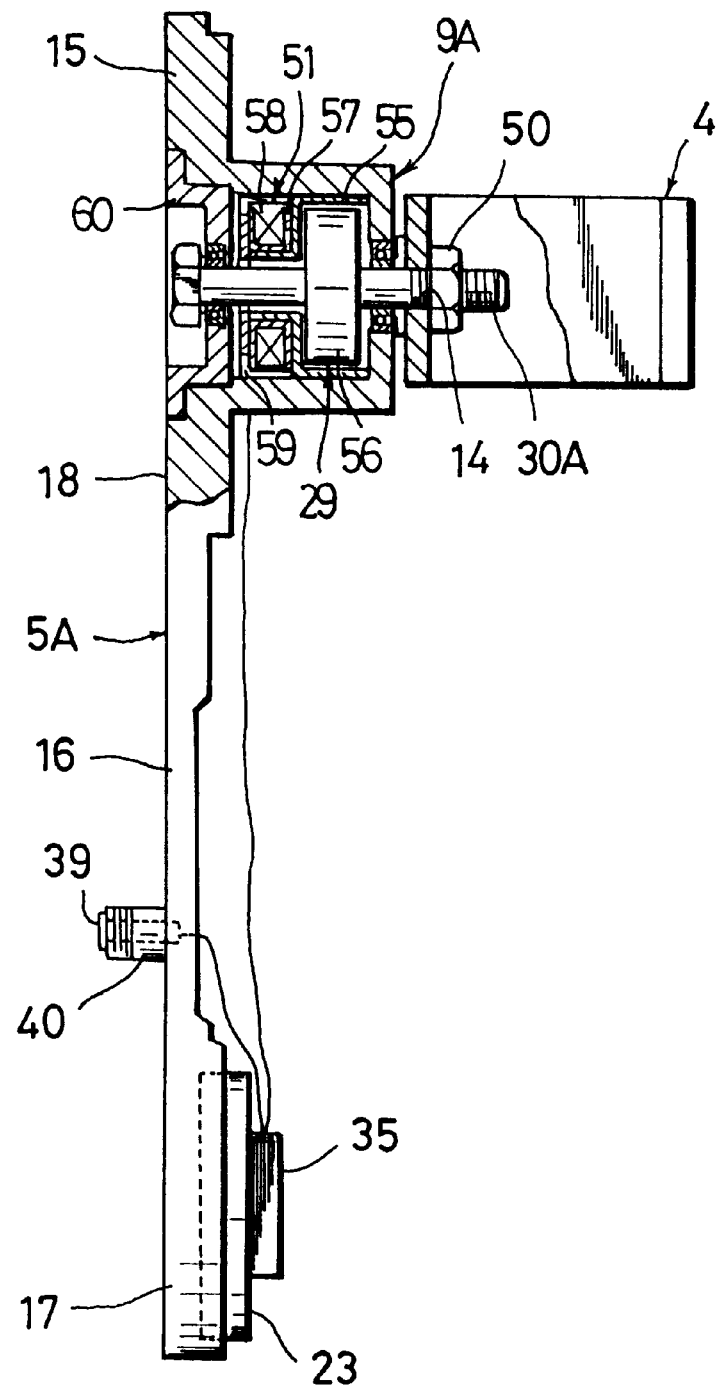
FIG. 34 is a mainly expanded back view from the rear showing a seventh embodiment of the present invention.

FIGS. 28 to 30 illustrate a sixth embodiment of the present invention. It is distinguished from the second embodiment in that a sound device 49 as the electric appliance 10 is mounted to the wheel cover body 6A, having a receiver 48 sounds warning melodies due to switch on and off a remote control 47 from the cabin, i.e. a driver's seat, of the vehicle. When a wheel cover 1E is mounted to the vehicle with lower noise such as an electric car and is used in it, the driver allows people or other veicles to inform the close by easily without surprising.

FIGS. 31 to 35 illustrate a seventh embodiment of the present invention. It is distinguished from the second embodiment in that an axle 30A of the rotor 29 is inserted into the fitable hole 14 of the fixable side fixture 4 and fixed by a nut 50, and in that a dynamo 9A includes a stator 51 which covers rotatably an outer circumferential portion of the rotor 29, the stator 51 fixed to a substantially central portion of the fitting piece 15 of the movable side fixture 5A. A wheel cover 1F with the dynamo 9A according to the seventh embodiment will have similar advantages to that according to the second embodiment.

Figure 35:
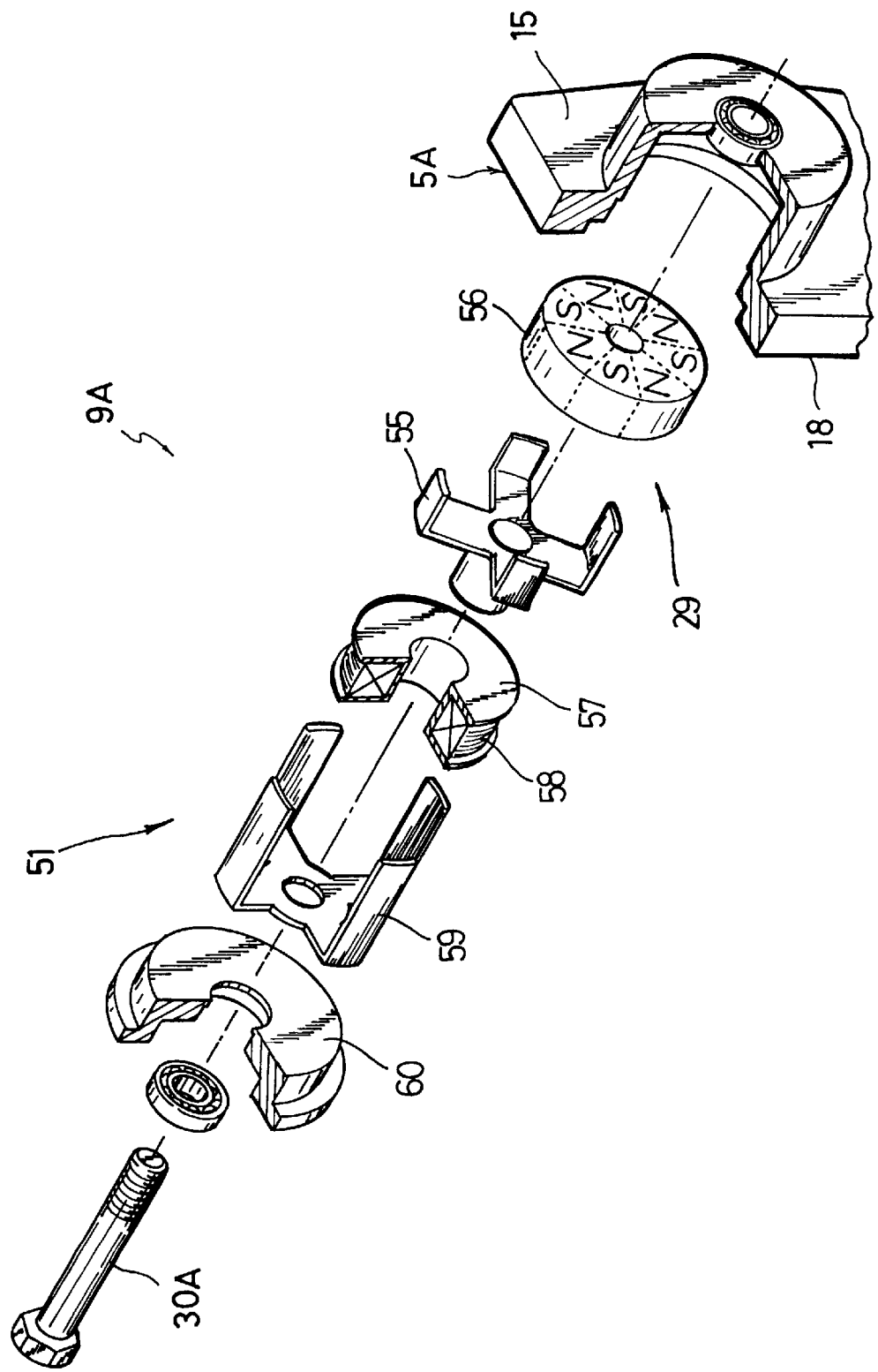
FIG. 35 is an exploded perspective view of a dynamo showing a seventh embodiment of the present invention.

In addtion, the dynamo 9A as shown in FIG. 35 comprises the rotor 29 and the stator 51 fixed to the movable side fixture 5A. The stator 29 further comprises a magnet 56 in the shape of a doughnut fixed to the axle 30A through a holder 55, in which N poles and S poles are alternately arranged. The stator 51 further comprises a coil 58, a holder 59, and a cover 60 which are mounted to the axle 30A through a bobbin 57 such that the stator 51 is located at a side surface portion of the magnet 56 of the rotor 29.

Figure 36:
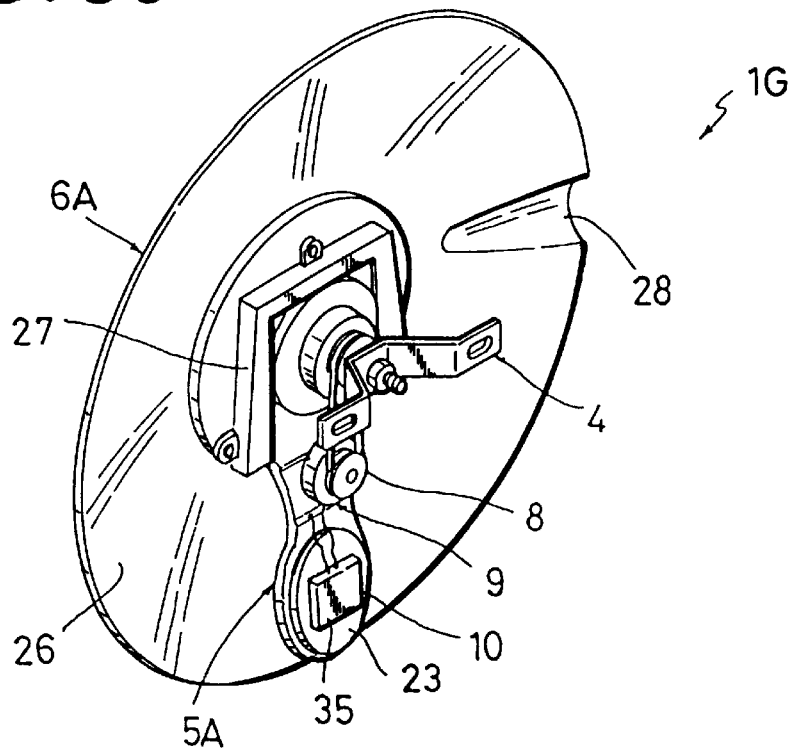
FIG. 36 is a perspective view from the rear showing an eighth embodiment of the present invention.
Figure 37:
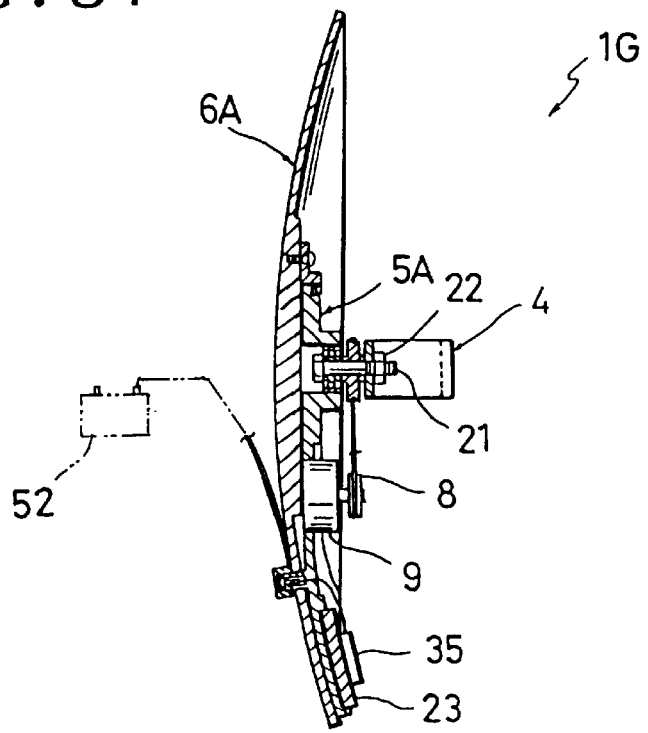
FIG. 37 is a vertical cross-sectional view showing an eighth embodiment of the present invention.
Figure 38:
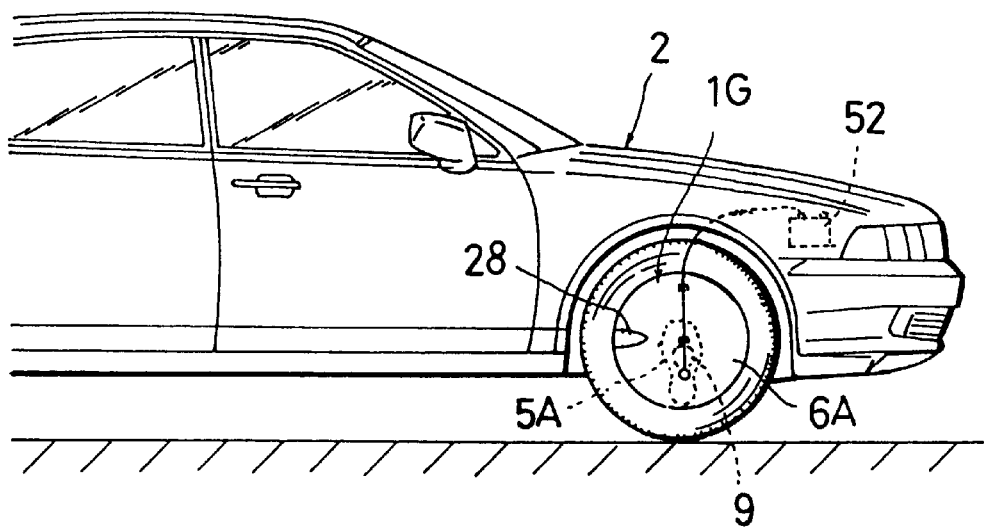
FIG. 38 is an explanation view showing an eighth embodiment of the present invention in use.

FIGS. 36 to 38 illustrate an eighth embodiment of the present invention. It is distinguished from the second embodiment in that the dynamo 9 is connected to a battery 52 through wires 54,54 attached to a body 53 such that electricity generated by the dynamo 9 is charged by the battery 52 of the passenger car 2. A wheel cover 1G with the according to the eighth embodiment will have similar advantages to that according to the second embodiment; in addtion, the wires 54,54 can be used as a rotating protection means for the wheel cover body 6A.

ADVANTAGES OF THE INVENTION

As set forth above, the advantages of the present invention are as follows:

(1) A wheel cover comprises a fixable side fixture for fixably mounting to the center of a wheel, so as to be able to position the cover to the central part thereof; a movable side fixture pivotably mounted to the central part of the fixable side fixture through a bearing; a wheel cover body, substantially in the shape of a disc and mounted on the movable side fixture, having a space between itself and the wheel; rotating protection means for the wheel cover body prevents to rotate integrally with the wheel; and a dynamo mounted on said movabled side fixture or wheel cover body and driven rotatably by rotating of said wheel, so that the fixable side fixture itself with the wheel rotates integrally when the vehicle is in motion, on the other hand, the movable side fixture and wheel cover body remain in substantially the determined rotrational position.

Therefore, the wheel cover body can be used for advertisment, or the like, picted on the surface thereof.

(2) As discussed above, the fixable side fixture rotates integrally with the wheel when the vehicle is in motion, so that the rotor of the dynamo rotates automatically, electricity can be generated.

Therefore, electricity generated can be used for the indicator and transmitter of electromagnetic wave, or the like.

(3) As discussed above, since the wheel cover body is mounted removably on the movable side fixture, the wheel cover body is removed and mounted easily.

Therefore, the wheel cover body can be replaced simply with other wheel cover body.

What is claimed is:

1. A wheel cover comprising:
   a fixable side fixture fixably mounted to the center of a wheel of a vehicle, so as to be able to position the cover to the central part thereof;
   a movable side fixture pivotally mounted to the central part of the fixable side fixture through a bearing;
   a wheel cover body, substantially in the shape of a disc and mounted on the movable side fixture, having a space between itself and the wheel;
   means for biasing the wheel cover body in order to prevent integral rotation with the wheel; and
   a dynamo mounted on said movable side fixture or wheel cover body and driven rotatably by rotating of said wheel.

2. A wheel cover body according to claim 1, wherein the biasing means comprises a weight provided to a free end portion of the movable side fixture.

3. A wheel cover body according to claim 1, wherein the biasing means comprises an air current guide part in the shape of a nose, located at an outer circumferential part of the wheel cover body.

4. A wheel cover body according to claim 1, wherein the biasing means futher comprises a weight provided to a free end portion of the movable side fixture and an air current guide part in the shape of a nose, located at an outer circumferential part of the wheel cover body.

5. A wheel cover body according to claim 1, wherein the wheel cover body includes an indicator indicated due to electricity generated by the dynamo.

6. A wheel cover body according to claim 1, wherein the wheel cover body or movable side fixture includes a transmitter of electromagnetic wave transmits its wave due to electricity generated by the dynamo.

7. A wheel cover comprising:
- a fixable side fixture fixably mounted to a wheel of a vehicle;
- a rotor of a dynamo fixably mounted to the fixable side fixture, so as to be able to position to the central part of the wheel;
- a stator of the dynamo rotatably mounted to the rotor;
- a wheel cover body, substantially in the shape of a disc and mounted on the stator, having a space between itself and the wheel; and
- means for biasing the wheel cover body, in order to prevent integral rotation with the wheel.

8. A wheel cover body according to claim 7, wherein the biasing means comprises a weight provided to a free end portion of the movable side fixture.

9. A wheel cover body according to claim 7, wherein the biasing means comprises an air current guide part in the shape of a nose, located at an outer circumferential part of the wheel cover body.

10. A wheel cover body according to claim 7, wherein the biasing means futher comprises a weight provided to a free end portion of the movable side fixture and an air current guide part in the shape of a nose, located at an outer circumferential part of the wheel cover body.

11. A wheel cover body according to claim 7, wherein the wheel cover body includes an indicator indicated due to electricity generated by the dynamo.

12. A wheel cover body according to claim 7, wherein the wheel cover body or movable side fixture includes a transmitter of electromagnetic wave transmits its wave due to electricity generated by the dynamo.

* * * * *